Aug. 27, 1935.   V. THOMAS   2,012,645
HOT DRINK DISPENSER
Filed May 17, 1934   5 Sheets-Sheet 4
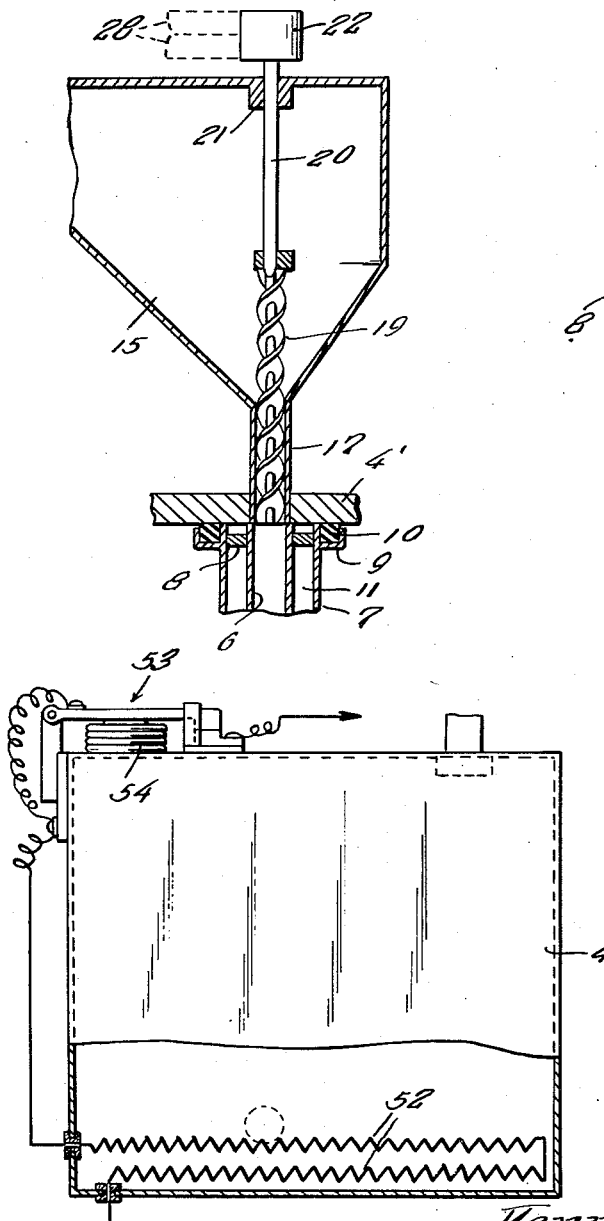
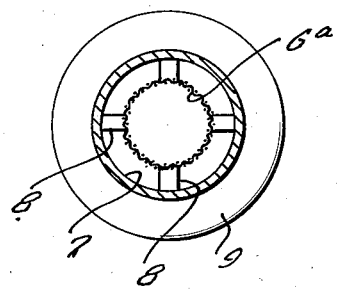
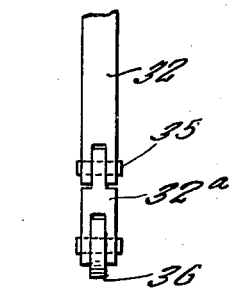
Inventor
Vernon Thomas,
By Clarence A. O'Brien
Attorney Aug. 27, 1935.  V. THOMAS  2,012,645
HOT DRINK DISPENSER
Filed May 17, 1934  5 Sheets-Sheet 5
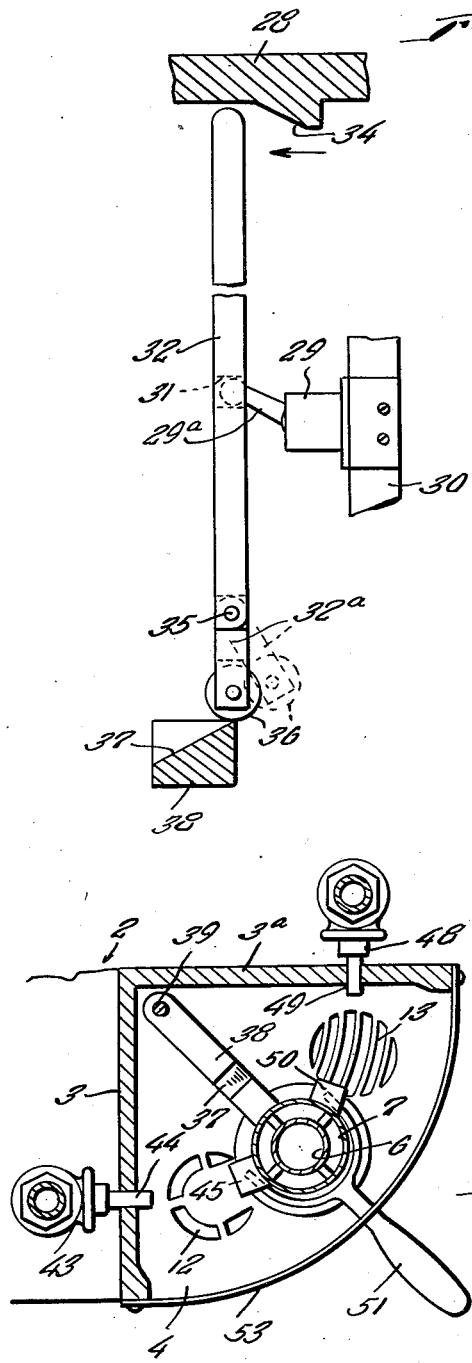
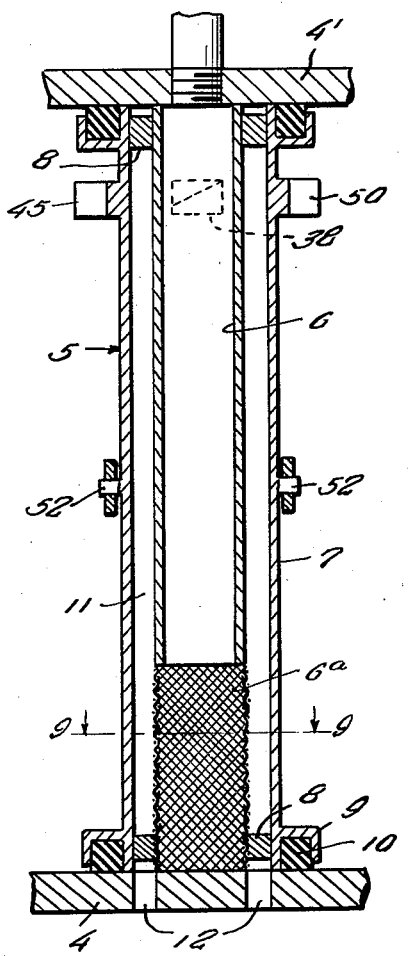
Inventor
Vernon Thomas,
By Clarence A. O'Brien
Attorney Patented Aug. 27, 1935

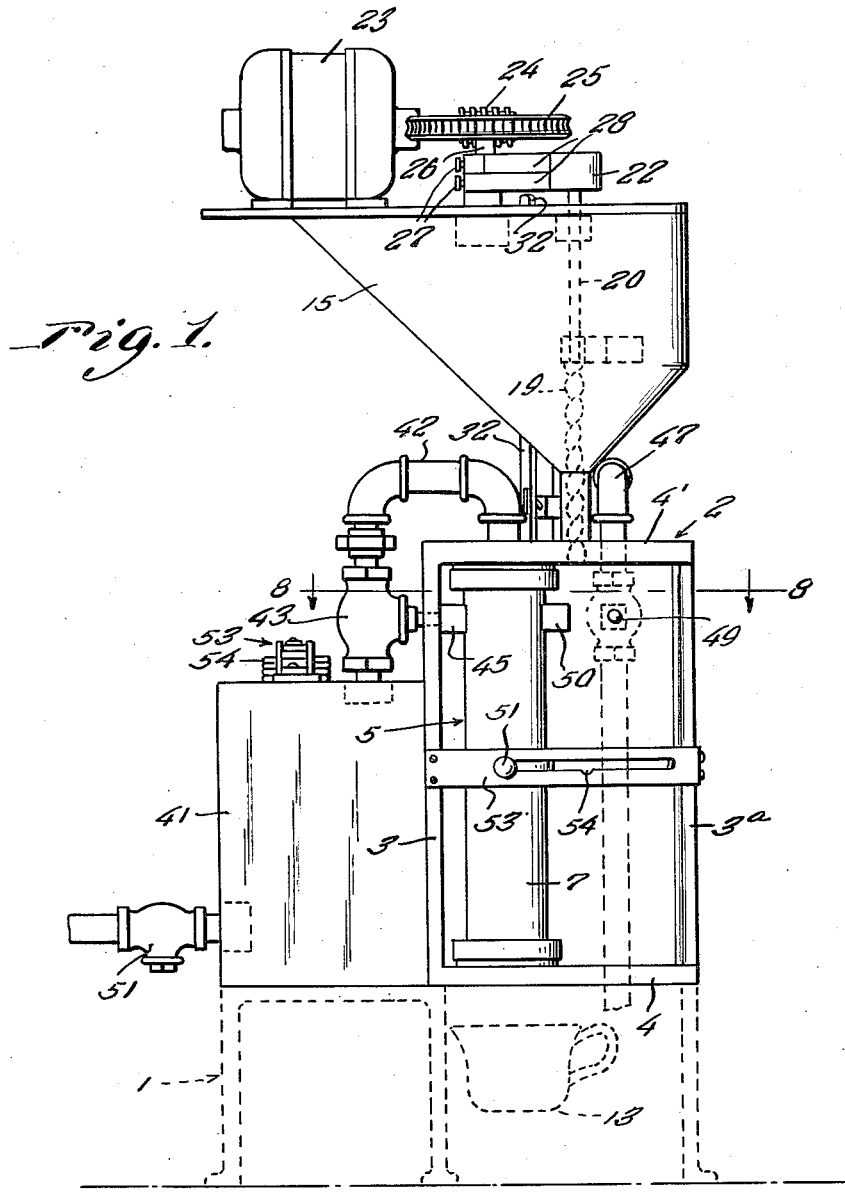

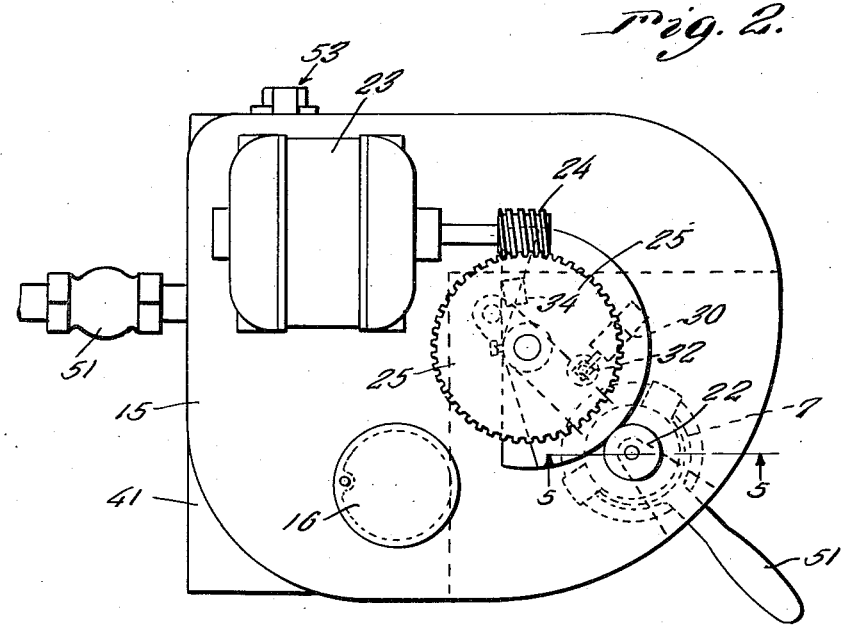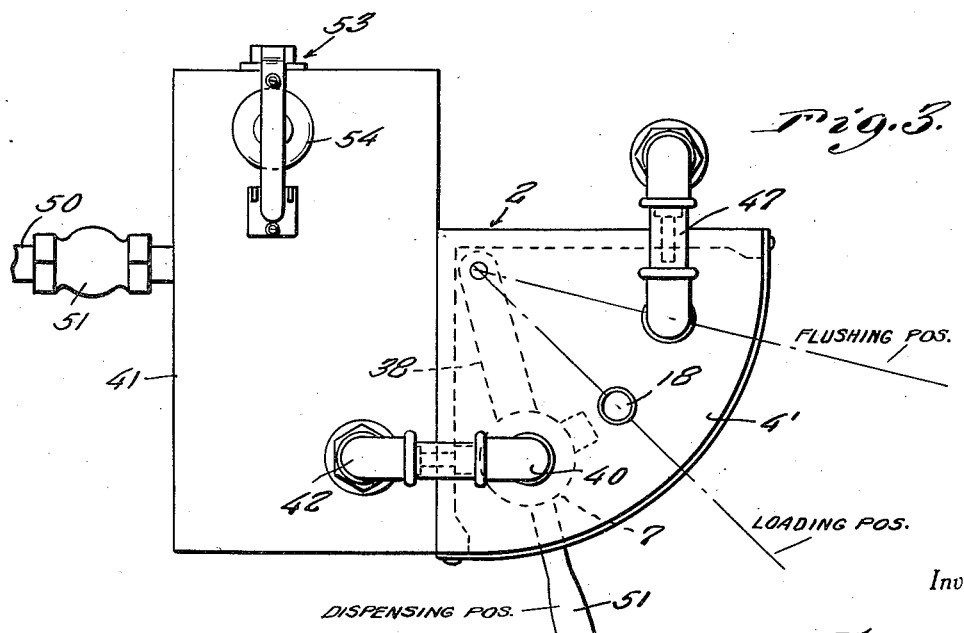

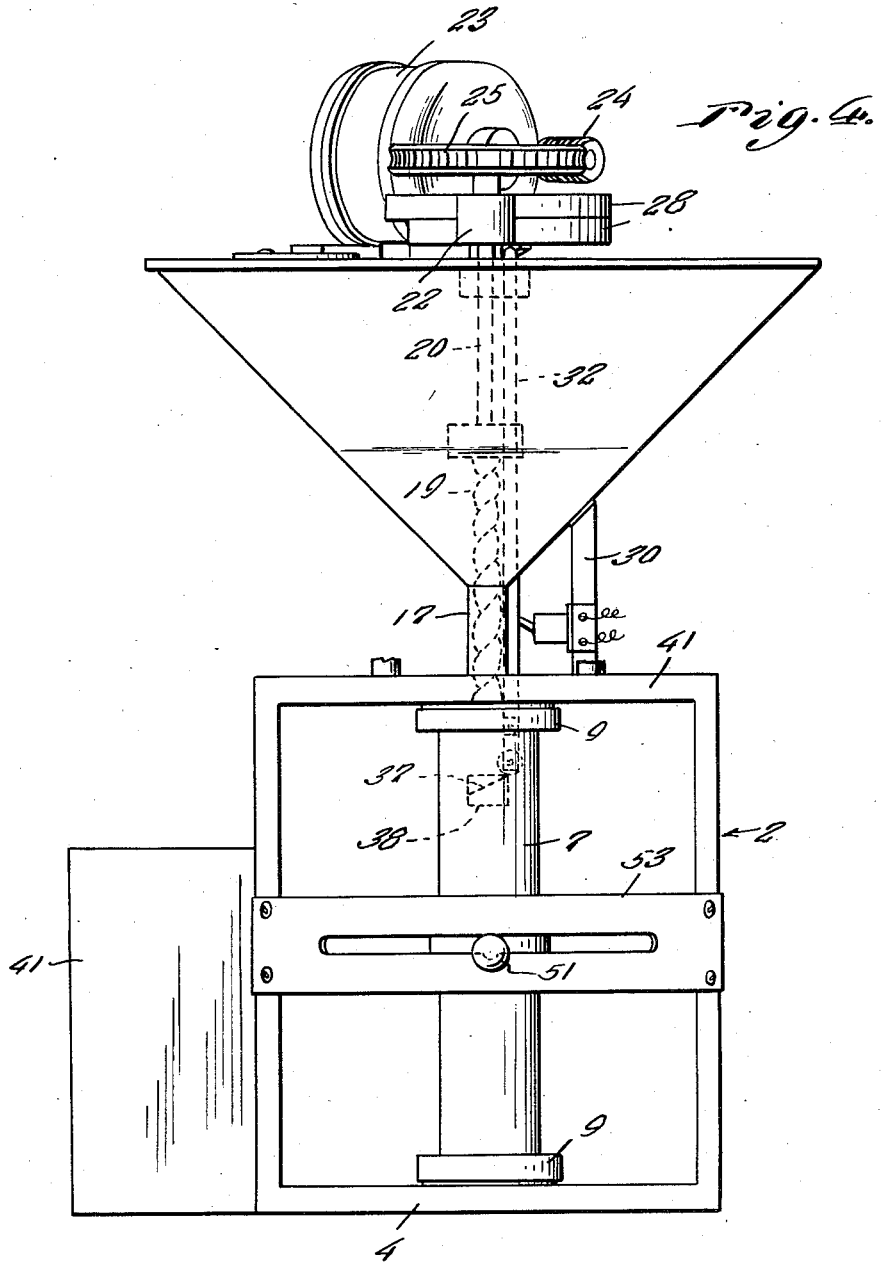

2,012,645

UNITED STATES PATENT OFFICE 2,012,645

HOT DRINK DISPENSER

Vernon Thomas, Duluth, Minn.

Application May 17, 1934, Serial No. 726,137

4 Claims. (Cl. 53—3)

This invention has reference to liquid dispensers and has as its object the provision of such a dispenser especially designed for dispensing hot drinks, such as coffee, cocoa and the like in such a manner that a fresh cup of the beverage desired is obtainable at each dispensing operation.

Further in accordance with the present invention a dispenser is provided whereby the material and liquid used in mixing the drinks are conveyed in an efficient manner to a mixing and discharge chamber, and wherein the feed of such material is automatically controlled.

The invention together with its objects and advantages will be best understood from a study of the following description taken in connection with the accompanying drawings wherein:

Figure 1 is a front elevational view of the dispenser.

Figure 2 is a top plan view.

Figure 3 is a top plan view with the hopper and associated parts removed.

Figure 4 is an elevational view at a forty-five degree angle to Figure 3.

Figure 5 is an enlarged fragmentary sectional view showing the upper and feed screw, together with other parts hereinafter more fully referred to, and taken substantially on the line 5—5 of Figure 2.

Figure 6 is a vertical sectional view through a casing and inner and outer cylinder arrangement hereinafter more fully referred to.

Figure 7 is an enlarged view partly in section and partly in elevation showing the switch operating means hereinafter more fully referred to.

Figure 8 is a detail view taken substantially on the line 8—8 of Figure 1.

Figure 9 is a sectional view taken substantially on the line 9—9 of Figure 6.

Figure 10 is an elevational view of the roller equipped end portion of the switch operating rod and Figure 11 is an elevational view of the water reservoir with parts broken away and showing the electrical heating device associated with the reservoir.

Referring to the drawings by reference numerals it will be seen that the dispenser is mounted on a suitable support or the like suggested by broken line in Figure 1 and indicated generally by the reference numeral 1. The dispensing device is indicated generally in Figures 1 and 4 and in the present instance comprises a housing 2 having segmental top and bottom walls 4, 4' connected by vertical walls 3, 3a which walls are disposed at right angles to one another.

A mixing and dispensing cylinder assembly 5 is arranged within the housing 2 and includes an inner cylinder 6 and an outer cylinder 7 connected with and spaced from the cylinder 6 through suitable spacers 8 arranged at the upper and lower ends of the cylinders. At said ends the outer cylinder 7 is provided with channels or grooved collars 9 that accommodate gaskets 10 arranged for wiping engagement with the inner faces of the walls 4 and 4' of the housing. These gaskets 10 provide an efficient joint between the cylinders and the top and bottom walls of the housing and at the same time exert sufficient pressure on walls of the housing to provide for friction that prevents too easy shifting of the cylinder assembly from one position to another.

The cylinders 6 and 7 are imperforate, and the inner cylinder 6 at its lower end is provided with a section 6a of reticulated material forming a screen through which the liquid mixture passes in dispensing from the cylinder assembly.

In Figure 3 is indicated the three positions, one of which is occupied at one time or the other by the cylinder assembly 5. In this connection it will be noted that the intermediate position is the loading position while the extreme right position is the flushing position and the extreme left position is the dispensing position.

When in the extreme left or dispensing position the space 11 between the cylinders 6 and 7 is directly over a series of segmental discharge slots 12 provided in the bottom 4 of the housing 2 so that the beverage passing from the cylinder 6 through the screen 6a into the space 11 will discharge from the space through the openings 12 into the cup or other suitable receptacle 13 that is held beneath the openings 12 in a manner suggested in Figure 1.

When the cylinder assembly 5 is in the flushing position, the cylinders are located over a series of slots or openings 13 so that the flushing water or the like passing through the cylinders 6 and 7 will drain through the slots 13 into any suitable receptacle to catch the flushing water.

The coffee, cocoa, or other flavoring material is accommodated within a supply hopper 15, the same being provided with a filling neck 16. The hopper 15 is also provided with a tubular discharge neck 17 that at its lower end is adapted to fit within an opening 18 provided in the top 4' of the housing 3, the opening 18 being located at a point midway between the termini of the arc in which the cylinder assembly moves.

To insure a positive feed of the material from the hopper 5 through the neck 17 there is provided a screw conveyor 19 provided on one end of a shaft 20 journalled in suitable bearings 21 provided therefor in the hopper 15. On the upper end of the shaft 20 is a friction wheel 22.

For driving the shaft 20 there is provided an electric motor 23 suitably mounted on the top of the hopper 15, and the armature shaft of the motor 23 is provided with a worm 24 in mesh with a worm wheel 25 provided on the upper end of a vertical shaft 26 mounted in a bearing suitably provided in the top of the hopper 15.

Also secured to the shaft 26 by set screws 27 is a pair of friction segments 28 that have frictional engagement with the friction wheel 22 transmitting movement of the shaft 26 to the shaft 20 of the feeder 19. The segments 28 lie one above the other and through the medium of the set screws 27 may be set so as to provide for a complete circle or any fractional part thereof as may be found desirable to govern the amount of the dry ingredients to be fed from the hopper 15 to the cylinder assembly 5.

For controlling the circuit to the motor 23 there is provided a suitable snap switch 29 mounted on a suitable supporting standard 30. The operating lever of the switch 29 is indicated by the reference numeral 29a and has its free end operating in the slot 31 of a vertically shiftable rod 32. The rod 32 operates through a suitable opening in the top wall of the housing 3, and has a portion extending upwardly through the hopper 15 to terminate slightly above the top of the hopper and in the path of a cam lug 34 provided on the under side of the lowermost one of the friction segments 28. At its lowest end the rod 32 is provided with a swinging section 32a that is pivoted to the rod 32 by a rule joint 35 in such a manner as to permit the section 32a to swing laterally of the rod 32 in a single direction indicated in Figure 7. The section 32a is provided with a roller 36 that is in wiping engagement with a cam surface 37 provided on the uppermost arm 38 of a pair of such arms 38.

The aforementioned arms 38 are secured to the outer cylinder 7 in any suitable manner preferably by being integral therewith, and at their free ends the arms 38 are engaged with a vertical pivot rod 39 that extends vertically within the housing 3 in the corner or angle between the walls 3 and 3a.

From the above it will be apparent that when the cylinder assembly 5 is in loading position the wheel 36 will be at the upper end of the cam surface 37. Thus when the lowermost friction segment 28 moves in position so as to engage the cam lug 34 thereon with the upper end of the rod 32 the latter will influence the rod 32 just enough to cause the section 32a of the bar to swing to the dotted line position and move the roller 36a out of engagement with the cam surface 37 as suggested in Figure 7. This displacement of the section 32a of the rod will permit the rod 32 to move downwardly thus actuating the lever 29 of the switch to open the switch 29 and thus interrupt the circuit to the motor 23. The interruption of the circuit to the motor 23 will of course result in an interruption of drive from the motor to the feed screw shaft 20 thus immediately stopping further feed of the material from the hopper 15 to the cylinder assembly 5.

Obviously when the cylinder assembly is moved from the flushing position to the intermediate or loading position stem 38 will engage the roller 36 causing the bar 32 to move upwardly and thus trip the switch 29 for closing the switch and completing the circuit to the motor 23 to thereby set the feed screw 19 in operation for feeding the material from the hopper 15 to the inner cylinder 6 of the cylinder assembly 5.

When the loading of the cylinder assembly 6 with the material from the hopper 15 has been completed in the manner just described the cylinder assembly 5 is shifted from the loading position shown in Figure 3 to the dispensing position shown in said figure. When in this last named position the space 11 between the cylinders 6 and 7 will be directly over the discharge apertures 12 while the upper end of the cylinder 6 will be in line with the hot water inlet 40 provided in the top wall 4' of the housing 3. When in this position hot water from the storage chamber 41 will be supplied to the cylinder assembly through the conduit connection 42 between the reservoir 41 and the inlet 40. In the connection 42 is arranged a control valve 43 having an operating stem or plunger extending through an opening in the wall 3 of the housing 2. The valve 43 is opened upon movement of the cylinder assembly 5 into the dispensing position through the medium of a bumper lug 45 provided on one side of the cylinder 7 and movable into engagement with the stem 44 of the valve to move the stem inwardly to open the valve upon movement of the cylinder assembly into the aforementioned dispensing position. Upon opening of the valve 43 the hot water, as before mentioned will flow from the reservoir 41 through the conduit 42 and the inlet 40 into the inner cylinder 6. Here the hot water will mix with the granular material, such as the coffee, cocoa or the like, and flavored thereby will pass through the screen 6a to discharge through the ports 12 and into the cup or other suitable vessel held beneath the openings 12.

After the dispensing operation the cylinder assembly 5 is moved from the dispensing position, past the loading position, and into the flushing position suggested in Figure 3. In this position the cylinders 6 and 7 will be disposed over the flushing outlets 13 and flushing water from a suitable source of supply will be caused to pass from the flushing supply conduit 47 through the cylinder 6, the screen 6a and the space 11 between the cylinders to discharge through the outlets 13. In this connection it will be apparent that the grounds or the like remaining in the cylinder 6 may be washed therefrom directly through the portions of the slots 13 that will extend across the open bottom of the cylinder 6. Thus a thorough flushing of the cylinder assembly will be accomplished.

For controlling the supply of the flushing water the flushing conduit 47 is provided with a valve 48 that has an operating plunger or stem 49 extending through an opening in the wall 3a of the housing and adapted to be engaged by a bumper lug 50 also carried by the cylinder 6 at the side thereof opposite to the lug 45, and arranged to engage the plunger 49 to move the same inwardly upon the positioning of the assembly 5 in the flushing position.

For positioning the cylinder assembly in any one of the several positions mentioned there is provided a suitable operating handle 51 that has a forked inner end pivoted to the outer cylinder 7 as at 52. The handle 51 operates in a slot provided in a plate 53 extending across the open side of the housing 2 and secured at its ends to the walls 3, 3a of the housing. Intermediate the ends of the slot the plate 53 is provided with a notch 54 to accommodate the handle 51 when the cylinder assembly is in the loading or intermediate position.

Water is supplied to the reservoir 41 from any suitable source through the medium of a conduit 50 connected with the reservoir 41 and provided with a check valve 51.

To maintain an even temperature for the water within the reservoir 41 there is suitably mounted within the reservoir and properly encased, an electrical heating unit 52 that is arranged in circuit with a suitable control switch 53 mounted in any suitable manner on the top of the reservoir 31. The switch 53 is controlled by a suitable thermostat 54, and when the temperature of the water rises above a predetermined amount the thermostat 54 will operate to open the switch 53 and thus interrupt the circuit to the heater 52. Upon a fall of the temperature the thermostat 54 will operate to permit a closing of the switch 53 to complete the circuit to the heater 52.

It is thought that from the above a clear understanding of the operation, construction and purpose of the invention will be had.

Having thus described my invention, what I claim as new is:

1. A hot drink mixer and dispenser including a housing having a mixing and dispensing device arranged therein and movable in the arc of a circle into an intermediate or loading position, a mixing and dispensing position at one end of the arc, and a flushing position at the opposite end of the arc; a hopper for beverage material, a motor driven variable screw feed device connecting the hopper with the housing for feeding a predetermined quantity of the material to the device, and including a switch for the motor, means connected with the switch for tripping the latter and operated by the placing of the device in loading position to close the circuit to the motor and by the driving means for the feed device to open the motor circuit when a predetermined quantity of the material has been fed thereby to the mixing and dispensing device.

2. A hot drink mixer and dispenser including a housing having a mixing and dispensing device arranged therein and movable in the arc of a circle into an intermediate or loading position, a mixing and dispensing position at one end of the arc, and a flushing position at the opposite end of the arc; a hopper for beverage material, a motor driven variable screw feed device connecting the hopper with the housing for feeding a predetermined quantity of the material to the device, and including a switch for the motor, means connected with the switch for tripping the latter and operated by the placing of the device in loading position to close the circuit to the motor and by the driving means for the feed device to open the motor circuit when a predetermined quantity of the material has been fed thereby to the mixing and dispensing device, and means operated by the placing of the mixing device in mixing and dispensing position for feeding a predetermined volume of liquid to and through the device and the material therein for mixing and discharging a predetermined amount of beverage.

3. A hot drink mixer and dispenser including a housing having a mixing and dispensing device arranged therein and movable in the arc of a circle into an intermediate or loading position, a mixing and dispensing position at one end of the arc, and a flushing position at the opposite end of the arc; a hopper for beverage material, a motor driven variable screw feed device connecting the hopper with the housing for feeding a predetermined quantity of the material to the device, and including a switch for the motor, means connected with the switch for tripping the latter and operated by the placing of the device in loading position to close the circuit to the motor and by the driving means for the feed device to open the motor circuit when a predetermined quantity of the material has been fed thereby to the mixing and dispensing device, and means operated by the placing of the mixing device in mixing and dispensing position for feeding a predetermined volume of liquid to and through the device and the material therein for mixing and discharging a predetermined amount of beverage, and means operated by the placing of the mixing device in flushing position to force under pressure water through the device for flushing the same.

4. A hot drink mixer and dispenser including a housing having a mixing and dispensing device arranged therein and movable in the arc of a circle, a fixed pivot rod arranged within the housing, arms extending from the mixing and dispensing device and engaged with the pivot rod, whereby the mixing and dispensing device is constrained to move in the housing in the arc of a circle concentric to the pivot rod, and into an intermediate or loading position, a mixing and dispensing position at one end of the path of movement of the device, and a flushing position at the opposite end of the path of movement, a hopper for beverage material, a screw feed for conveying beverage material to the housing for charging the mixing and dispensing device when the latter is in loading position, an electric motor, friction drive means connecting the motor with the screw feed, an electric switch for the motor, a vertically shiftable member connected with the switch for tripping it, cam means on one of said arms for engaging said vertically shiftable member to cause the same to move upwardly to close the switch upon movement of the mixing and dispensing device to a loading position, and cam means controlled by the friction drive means and engageable with the upper end of said vertically shiftable member to cause the same to move downwardly to open the switch when a predetermined quantity of the beverage material has been fed to the mixing and dispensing device.

VERNON THOMAS.